(12) United States Patent
Hofmann et al.

(10) Patent No.: US 6,896,268 B2
(45) Date of Patent: May 24, 2005

(54) SHAPED SEAL FOR SEALING A POWER-OPERATED CLOSING DEVICE

(75) Inventors: Knut Hofmann, Wangen (DE); Bernd Westerhoff, Langenargen (DE)

(73) Assignee: Metzeler Automotive Profile Systems GmbH, Lindau (DE)

( * ) Notice: Subject to any disclaimer, the term of this patent is extended or adjusted under 35 U.S.C. 154(b) by 0 days.

(21) Appl. No.: 10/909,871

(22) Filed: Aug. 2, 2004

(65) Prior Publication Data

US 2005/0017460 A1  Jan. 27, 2005

Related U.S. Application Data

(63) Continuation of application No. 09/937,083, filed as application No. PCT/EP00/02501 on Mar. 21, 2000, now abandoned.

(30) Foreign Application Priority Data

Mar. 23, 1999 (DE) ................. 199 13 105

(51) Int. Cl.[7] ............ H01H 3/16; F16J 15/32; E05F 15/02
(52) U.S. Cl. ............ 277/317; 277/637; 277/645; 277/921; 277/919; 49/28; 200/61.43
(58) Field of Search ............. 277/317, 628, 277/630, 637, 644–645, 919–921; 49/26–28; 200/61.43

(56) References Cited

U.S. PATENT DOCUMENTS

| | | | |
|---|---|---|---|
| 3,056,628 A * | 10/1962 | Golde | 296/219 |
| 4,271,634 A * | 6/1981 | Andrzejewski | 49/490.1 |
| 4,542,610 A * | 9/1985 | Weimar | 49/490.1 |
| 4,826,232 A * | 5/1989 | Wissler | 296/216.09 |
| 5,296,658 A * | 3/1994 | Kramer et al. | 200/61.43 |
| 5,437,124 A * | 8/1995 | Ahlfeld et al. | 49/479.1 |
| 5,438,798 A * | 8/1995 | Plamper et al. | 49/28 |
| 5,459,962 A * | 10/1995 | Bonne et al. | 49/28 |
| 5,592,060 A * | 1/1997 | Racine et al. | 318/469 |
| 6,038,930 A * | 3/2000 | Lehnen et al. | 73/774 |
| 6,079,771 A * | 6/2000 | Brandner et al. | 296/216.09 |
| 6,233,872 B1 * | 5/2001 | Glagow et al. | 49/27 |
| 6,337,549 B1 * | 1/2002 | Bledin | 318/466 |
| 6,389,752 B1 * | 5/2002 | Rosenau | 49/28 |
| 6,396,010 B1 * | 5/2002 | Woodward et al. | 200/61.43 |
| 6,534,731 B1 * | 3/2003 | Beckhausen et al. | 200/61.43 |

FOREIGN PATENT DOCUMENTS

| | | | |
|---|---|---|---|
| FR | 1549640 | * | 12/1968 |
| GB | 1198439 | * | 7/1970 |

* cited by examiner

Primary Examiner—Alison Pickard
Assistant Examiner—Vishal Patel
(74) Attorney, Agent, or Firm—Stephen B. Salai, Esq.; Thomas B. Ryan; Harter, Secrest & Emery LLP

(57) ABSTRACT

The invention relates to a shaped seal for sealing a power-operated closing device comprising a jam-protection zone, which has at least two electrically conductive areas, situated at a distance from each other. According to the invention, to save space and reduce weight and cost, the carrier is used as a metallic conductor for the conductive area so as to reduce volume resistance. Alternatively or in addition thereto, a frame can be used to which the shaped seal can be fixed.

15 Claims, 3 Drawing Sheets

SHAPED SEAL FOR SEALING A POWER-OPERATED CLOSING DEVICE

CROSS-REFERENCE TO RELATED APPLICATIONS

This application is a continuation of U.S. application Ser. No. 09/937,083 filed Aug. 29, 2002, now abandoned as the National Stage of International Application No. PCT/EP00/02501, filed Mar. 21, 2000, which application is hereby incorporated by reference.

BACKGROUND OF THE INVENTION

1. Field of the Invention

The present invention relates to a shaped seal or sealing profile for weathersealing a powered closing device, including an anti-trap guard comprising at least two electrically conductive portions spaced away from each other, whose contact triggers a switching action for activating the drive assembly of the closing device in which at least one of these portions is electrically conductive connected to a metallic conductor to reduce the volume resistivity.

2. Description of Related Art

A generic sealing profile is known from DE 197 20 713 C1 originated to the same Applicant. This known sealing profile comprises two electrically conductive portions spaced away from each other, in each of which a metallic conductor is embedded to reduce the volume resistivity. The disadvantage in making use of these two metallic conductors is that they take up a lot of room, relatively, and add to the price and weight of the sealing profile whilst complicating production since both metallic conductors need to be coextruded.

Furthermore, FR 1.549.640 A discloses an anti-trap guard for a powered window wherein a sealing profile is incorporated in a frame. This sealing profile comprises an electrically conductive insert, which contacts the frame configured as an electrical conductor in a trapped situation so as to trigger a switching action. In the trapped situation the insert, together with the sealing profile, is shifted relative to the frame, wherein flexible tongues on the sealing profile ensure that the sealing profile returns to its original position. Actual practice has shown such a configuration to be unsatisfactory.

It is thus the objective of the present invention to sophisticate a generic sealing profile to achieve cost-effective production for a low price, weight and space requirement.

BRIEF SUMMARY OF THE INVENTION

The sealing profile in accordance with the invention now makes it possible to totally eliminate a metallic conductor as needed hitherto. Instead of this, recourse is made to the carrier of the sealing profile existing in many cases. This carrier is, as a rule, made of a light metal and is thus electrically conductive. As an alternative, or in addition thereto, a flange or frame may be used to which the sealing profile is securable. This flange or frame is already available, especially in automotive applications, and is made of an electrically conductive metal. Due to totally eliminating one of the metallic conductors as needed hitherto, the production of the sealing profile in accordance with the invention is substantially simplified, with a further reduction in price and weight, as well as reducing the space requirement.

Advantageous aspects and further embodiments read from the dependent claims.

In a first advantageous aspect the carrier contacts the electrically conductive portion. In this case the electrically conductive portion is arranged only on one side of the carrier in thus simplifying production.

In a second advantageous aspect the carrier is partly or totally surrounded by the electrically conductive portion in thus enlarging the contact surface area between the electrically conductive portion and the carrier so that the volume resistivity can be further reduced.

In accordance with one further embodiment the carrier is provided with recesses. These recesses reduce the weight of the carrier and permit flexing of the sealing profile. In addition, the recesses permit, for a carrier surrounded partly or fully by the electrically conductive portion, a direct electrically conductive connection from one side of the carrier to the other.

This is of advantage when a carrier of an electrically non-conductive material, or a carrier insulated from the electrically conductive portion, is used. The recesses also make it possible in these cases to produce an electrically conductive connection from one side of the carrier to the other.

Advantageously the electrically conductive portion extends up to the outer side of the sealing profile to thus produce an electrical contact with the flange or frame to which the sealing profile can be secured without an additional electrical conductor needing to be provided, i.e. the sealing profile merely requiring to be secured, as usual, to the flange or frame.

In another advantageous aspect, the electrically conductive portion comprises lips or tabs for securing the sealing profile to the flange or frame. These lips or tabs are pressed into contact with the flange or frame to produce a good electrical contact so that the volume resistivity of the sealing profile can be reliably diminished.

In another advantageous further embodiment the anti-trap guard portion comprises a hollow chamber in which at least one of the electrically conductive portions is arranged. Advantageously, one of the electrically conductive portions is arranged at the inner side of the hollow chamber whilst the other protrudes into the hollow chamber to thus achieve a reliable contact between the electrically conductive portions, irrespective of the anti-trap guard.

In yet another advantageous aspect the hollow chamber serves to weatherseal the powered closing device. The anti-trap guard portion of the sealing profile in accordance with the invention then satisfies a dual function whilst eliminating the need for additional elements for weathersealing the closing device in thus further reducing the space requirement and weight as well as the price of the sealing profile in accordance with the invention.

Advantageously the electrically conductive portion, provided separate from the carrier, flange or frame, comprises a metallic conductor, as a result of which the volume resistivity in this portion too is considerably reduced.

BRIEF DESCRIPTION OF THE SEVERAL VIEWS OF THE DRAWING(S)

The invention will now be detailed by way of example embodiments as shown in the drawing diagrammatically in which.

DETAILED DESCRIPTION OF THE INVENTION

Figure 1:
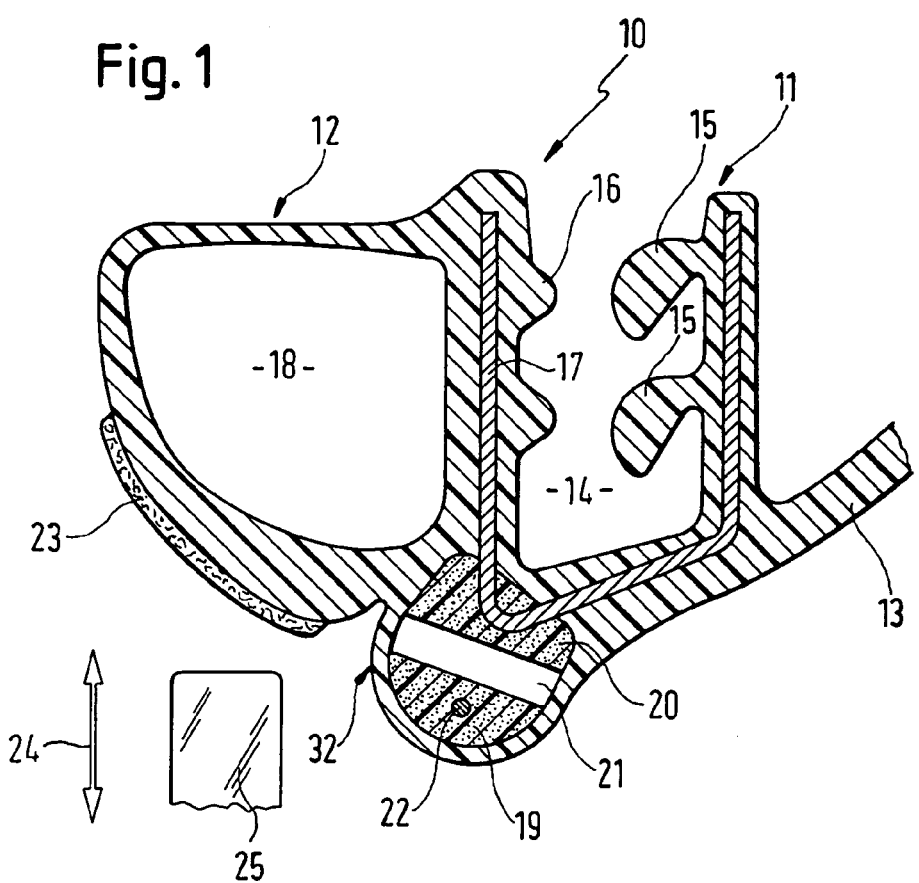
FIG. 1 is a cross-section through a first embodiment of the sealing profile in accordance with the invention.

Referring now to FIG. 1 there is illustrated a first embodiment of a sealing profile 10 in accordance with the invention. The sealing profile 10 comprises a clamping portion 11 as well as a sealing portion 12. Further provided is a cover 13 with which components (not shown) are covered after the sealing profile 10 has been secured in place. For securing it in place, the clamping portion 11 comprises a recess 14 into which several lips 15 and protuberances 16 protrude. The recess 14 is clasped by a carrier 17 having a U-shaped cross-section. For securing it in place, the recess 14 of the clamping portion 11 is mounted on a flange as evident from FIG. 5. In this arrangement the lips 15 and protuberances 16 are firmly pressed against the flange in preventing release of the sealing profile 10.

The sealing portion 12 comprises a hollow chamber 18 which at its side facing a window pane 25 is provided with a friction-reducing coating 23, more particularly a flake coating. The windowpane 25 is movable in the direction of the arrows 24. When the windowpane 25 is closed the hollow chamber 18 is deformed so that the desired weatherseal is furnished.

The sealing profile 10 comprises further an anti-trap guard portion 32. The anti-trap guard portion 32 includes two electrically conductive portions 19, 20 spaced away from each other by an interspace 21. As soon as an object is trapped on closing of the windowpane 25, the portion 19 is moved in the direction of the portion 20. Contact of the two portions 19, 20 triggers a switching action for activating the drive assembly of the windowpane 25. This switching action can either halt or reverse the movement of the windowpane 25.

The portions 19, 20 are made to advantage by adding an electrically conductive material to the base material of the sealing profile 10 by means of coextrusion. To reduce the volume resistivity the portions 19 comprises a metallic conductor 22. The portion 20 partly surrounds the carrier 17 configured as a metallic conductor, as a result of which the volume resistivity of the electrically conductive portion 20 is likewise diminished. No additional metallic conductor is needed for the portion 20.

In the embodiment as shown in FIG. 1 all electrically conductive components 17, 22 and portions 19, 20 are surrounded by the electrically non-conductive material of the sealing profile 10. The sealing profile 10 is thus electrically neutral as regards its surroundings.

Figure 2:
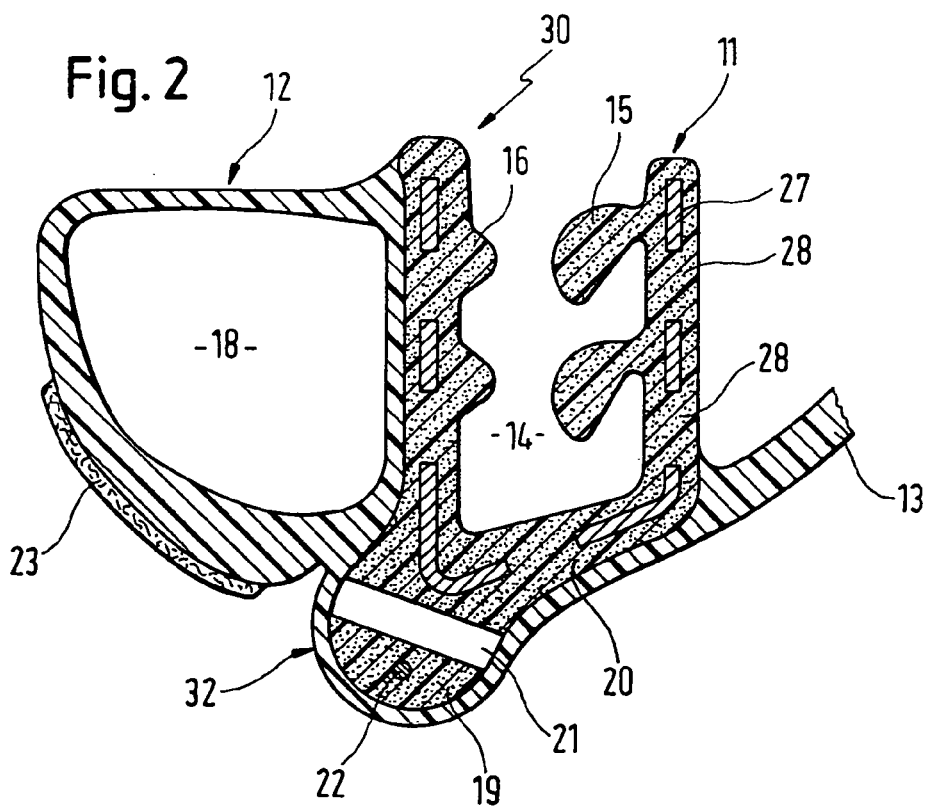
FIG. 2 is a cross-section through a second embodiment of the sealing profile in accordance with the invention.
Figure 3:
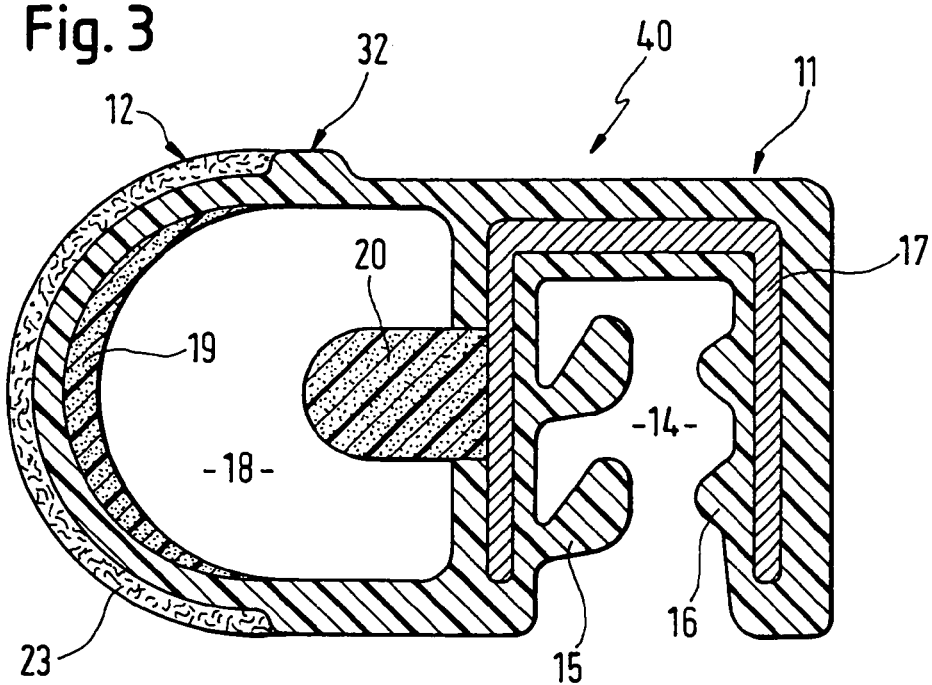
FIG. 3 is a cross-section through a third embodiment of the sealing profile in accordance with the invention.
Figure 4:
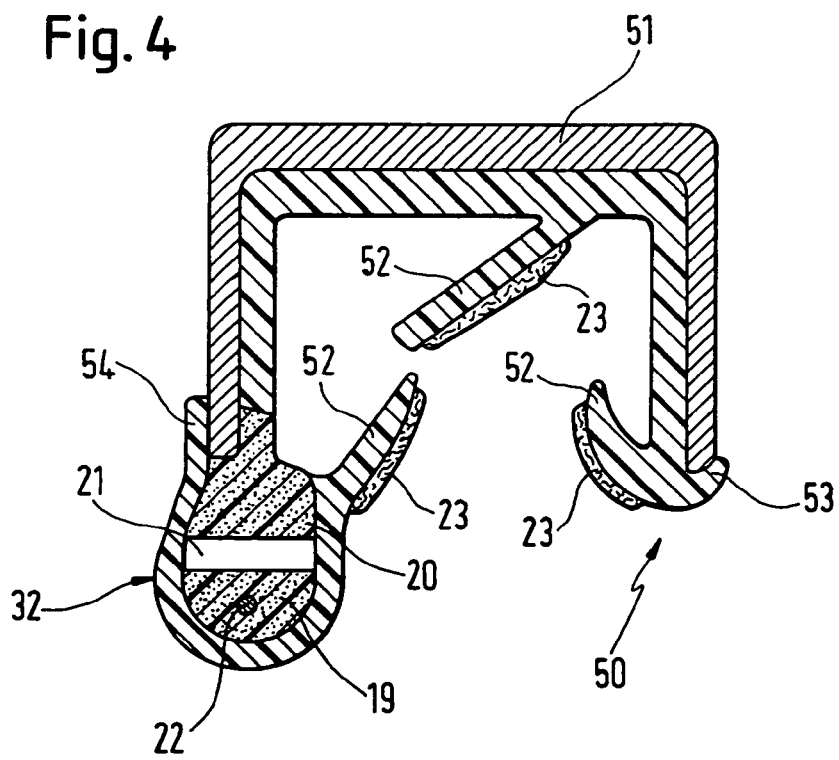
FIG. 4 is a cross-section through a fourth embodiment of the sealing profile in accordance with the invention.

Three further embodiments of a sealing profile 30, 40, 50 in accordance with the invention are shown in FIGS. 2 to 4, whereby like or functionally identical components are identified by the same reference numerals as in FIG. 1, for the description of which, reference is made to the above comments to avoid tedious repetition.

Referring now to FIG. 2 there is illustrated how the sealing profile 30 comprises a carrier 27, which is totally surrounded by the electrically conductive portion 20. The carrier 27 is provided with recesses 28 through which the material of the electrically conductive portion 20 penetrates. The contact surface area between the electrically conductive portion 20 and the carrier 27 is substantially increased by the recesses 28. Furthermore, any potential difference can be conducted from one side of the carrier 27 through the recesses 28 to the other side of the carrier 27 solely through the portion 20. Even when not using a non-conductive carrier 27 the inner side and outer side of the carrier 27 are electrically interconnected by the recesses 28.

The electrically conductive portion 20 extends up to the outer side of the sealing profile 30. As soon as the sealing profile 30 is secured to a flange or frame, the lips 15 and protuberances 16 of the clamping portion 11 come into electrically conductive contact with the flange or frame to thus substantially reduce the volume resistivity of the electrically conductive portion 20, this further making it possible to use a carrier 27 of a non-conductive material, such as plastics, for example.

Referring now to FIG. 3 there is illustrated how the sealing profile 40 comprises a hollow chamber 18 in the anti-trap guard portion 32. Arranged in the hollow chamber 18 are the electrically conductive portions 19, 20, the portion 20 contacting the carrier 17. Deformation of the hollow chamber 18 brings the portions 19, 20 into contact with each other in triggering the switching action as described above.

At the same time the hollow chamber 18 of the anti-trap guard portion 32 serves to seal off a powered closing device (not shown in FIG. 3). More particularly the sealing profile 40 as shown in FIG. 3 can be put to use to weatherseal an automotive sunroof.

Referring now to FIG. 4 there is illustrated a sealing profile 50 in accordance with the invention, which is inserted into a substantially U-shaped frame 51 made of an electrically conductive material. The sealing profile 50 comprises a series of lips 52 having a friction-reducing coating 23 for sealing contact with the windowpane 25. Tabs 53, 54 serve to secure the sealing profile 50. The electrically conductive portion 20 of the anti-trap guard portion 32 clasps the frame 51 in part and extends up to the outer side of the sealing profile 50.

Figure 5:
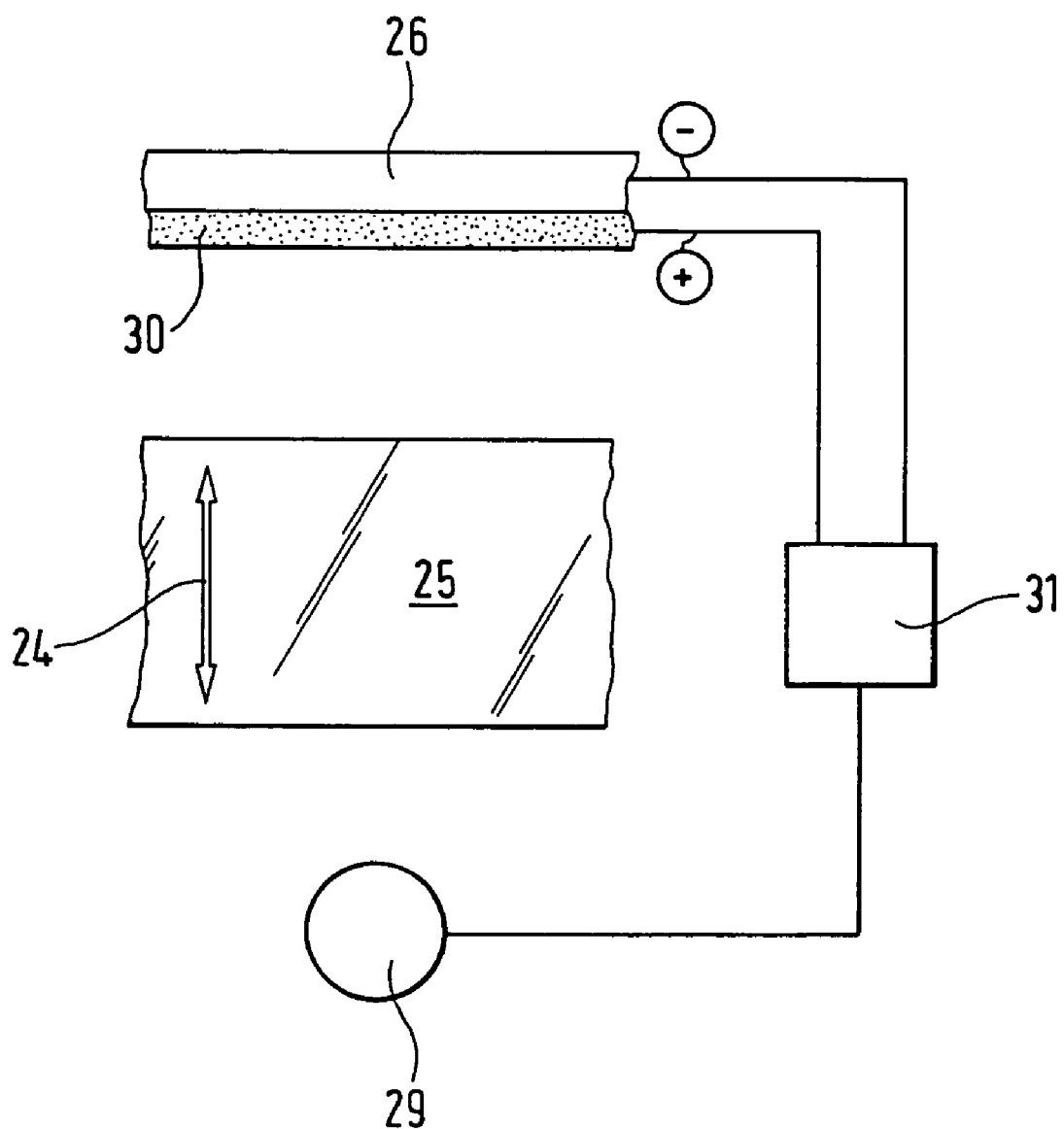
FIG. 5 is a system diagram of the principle involved.

The sealing profiles 10, 30, 50 as shown in FIGS. 1, 2 and 4 are particularly suitable for weathersealing automotive side windows. Referring now to FIG. 5 there is illustrated a system diagram of the sealing profile 30 in the fitted condition. The sealing profile 30 is mounted on a flange 26 by its clamping portion 11. The flange 26 is thus in electrically conductive contact with the electrically conductive portion 20 via the lips 15 and protuberances 16. As is usual in automotive applications, the flange 26 is grounded, whilst the electrically conductive portions 19 of the sealing profile 30 is connected to the anode of a voltage source (not shown). As soon as the windowpane 25 is lifted and the anti-trap guard portion 32 deformed, the two portions 19, 20 come into contact with each other, resulting in a switching action, which is signaled to a controller 31. The controller 31 correspondingly controls a motor 29 to move the windowpane 25, which halts or reverses the movement of the windowpane 25.

The sealing profile 10, 30, 40, 50 in accordance with the invention permits total elimination of one of the metallic conductors hitherto required, without having a detrimental effect on the anti-trap guard and sealing function. Instead, the space requirement, weight, costs and complications in production are all substantially reduced, as compared to known sealing profiles.

What is claimed is:

1. A shaped seal for a powered closing device comprising:
   a clamping portion including a metallic carrier surrounding a recess in the clamping portion;

an anti-trap guard portion including first and second electrically conductive portions separated by a space;

the anti-trap guard portion being deformable for moving the first and second electrically conductive portions into contact with each other through the space, resulting in a switching action affecting operation of the powered closing device;

a metallic conductor in electrical contact with the first electrically conductive portion for reducing volume resistivity of the first electrically conductive portion; and the metallic carrier being in electrical contact with the second electrically conductive portion for reducing volume resistivity of the second electrically conductive portion.

2. The shaped seal of claim 1 in which the metallic carrier is at least partially embedded within the second electrically conductive portion.

3. The shaped seal of claim 2 in which the second electrically conductive portion within which the metallic carrier is embedded extends within the clamping portion.

4. The shaped seal of claim 2 in which the metallic conductor is at least partially embedded within the first electrically conductive portion.

5. The shaped seal of claim 1 in which the metallic carrier is at least partially embedded within both the anti-trap guard portion and the clamping portion.

6. The shaped seal of claim 5 in which the metallic carrier has a U-shaped cross section surrounding the recess in the clamping portion.

7. The shaped seal of claim 1 in which a nonconductive cover at least partially surrounds the anti-trap guard portion.

8. The shaped seal of claim 7 in which the first and second electrically conductive portions, the metallic conductor, and the metallic carrier are surrounded by nonconductive material.

9. The shaped seal of claim 1 in which the shaped seal is formed from a base material and the first and second electrically conductive portions are made by adding an electrically conductive material to the base material.

10. The shaped seal of claim 1 further comprising a sealing portion within which the anti-trap guard portion, the sealing portion being deformable for moving the first and second electrically conductive portions into contact with each other through the space within the hollow chamber.

11. A shaped seal for a powered closing device mountable on an electrically conductive flange or frame comprising:

a clamping portion including a carrier shaped as a clasp surrounding a recess in the clamping portion for securing the shaped seal to the electrically conductive flange or frame;

an anti-trap guard portion including first and second electrically conductive portions separated by a space;

the anti-trap guard portion being deformable for moving the first and second electrically conductive portions into contact with each other through the space, resulting in a switching action affecting operation of the powered closing device;

a metallic conductor in electrical contact with the first electrically conductive portion for reducing volume resistivity of the first electrically conductive portion; and a part of the second electrically conductive portion extending within the clamping portion for electrically contacting the conductive flange or frame to reduce volume resistivity within the second electrically conductive portion.

12. The shaped seal of claim 11 in which the clamping portion includes protuberances projecting into the recess for contacting the conductive flange or frame and in which the protuberances are at least partially formed by the part of the second electrically conductive portion that extends within the clamping portion.

13. The shaped seal of claim 11 in which the carrier is formed by a non-electrically conducting material.

14. The shaped seal of claim 13 in which the carrier includes recesses that are filled by the second electrically conductive portion.

15. The shaped seal of claim 11 in which the shaped seal is formed from a base material and the first and second electrically conductive portions are made by adding an electrically conductive material to the base material.

* * * * *